(12) United States Patent
Wilson

(10) Patent No.: US 10,392,915 B2
(45) Date of Patent: Aug. 27, 2019

(54) FRACTURING UTILIZING AN AIR/FUEL MIXTURE

(71) Applicant: Twin Disc, Inc., Racine, WI (US)

(72) Inventor: Edwin E. Wilson, Colleyville, TX (US)

(73) Assignee: Twin Disc, Inc., Racine, WI (US)

( * ) Notice: Subject to any disclaimer, the term of this patent is extended or adjusted under 35 U.S.C. 154(b) by 0 days.

(21) Appl. No.: 15/736,503

(22) PCT Filed: Jun. 16, 2016

(86) PCT No.: PCT/US2016/037887
§ 371 (c)(1),
(2) Date: Dec. 14, 2017

(87) PCT Pub. No.: WO2016/205527
PCT Pub. Date: Dec. 22, 2016

(65) Prior Publication Data
US 2018/0149007 A1    May 31, 2018

Related U.S. Application Data

(60) Provisional application No. 62/180,473, filed on Jun. 16, 2015.

(51) Int. Cl.
*E21B 43/263* (2006.01)
*C09K 8/62* (2006.01)
*C09K 8/66* (2006.01)
*C09K 8/80* (2006.01)
*E21B 43/248* (2006.01)

(52) U.S. Cl.
CPC .............. *E21B 43/263* (2013.01); *C09K 8/62* (2013.01); *C09K 8/665* (2013.01); *C09K 8/80* (2013.01); *E21B 43/248* (2013.01)

(58) Field of Classification Search
None
See application file for complete search history.

(56) References Cited

U.S. PATENT DOCUMENTS

| | | | |
|---|---|---|---|
| 4,360,062 | A | 11/1982 | Browning |
| 5,346,015 | A | 9/1994 | Grundmann |
| 5,402,846 | A | 4/1995 | Jennings, Jr. et al. |
| 7,243,725 | B2 | 7/2007 | George et al. |
| 8,261,823 | B1 | 9/2012 | Hill et al. |
| 8,869,889 | B2 | 10/2014 | Palmer et al. |

(Continued)

FOREIGN PATENT DOCUMENTS

| | | |
|---|---|---|
| WO | 2013081609 A1 | 6/2013 |
| WO | 2013151604 A1 | 10/2013 |
| WO | 2013154628 A1 | 10/2013 |

*Primary Examiner* — Andrew Sue-Ako
(74) *Attorney, Agent, or Firm* — Boyle Fredrickson S.C.

(57) ABSTRACT

A method of producing subterranean fractures in geologic formations for the extraction of hydrocarbons includes flowing an air and fuel mixture into a well hole. The well hole may then be sealed with a packer plug creating a compression chamber with the air and fuel mixture. A liquid, such as water, may be pumped into the well hole to create pressure in the compression chamber. The build-up of pressure eventually causes auto-ignition of the air and fuel mixture which fractures the formation. The water may then rush into the compression chamber which thermally shocks the area causing additional fractures. The water may vaporize to steam and thoroughly disinfect the well hole eliminating the need for added biocides.

20 Claims, 13 Drawing Sheets

(56) References Cited

U.S. PATENT DOCUMENTS

2007/0204991 A1    9/2007   Loree et al.
2009/0050319 A1    2/2009   Kaminsky et al.
2013/0032337 A1    2/2013   Rytlewski et al.
2013/0161007 A1    6/2013   Wolfe et al.
2014/0262249 A1    9/2014   Willberg et al.

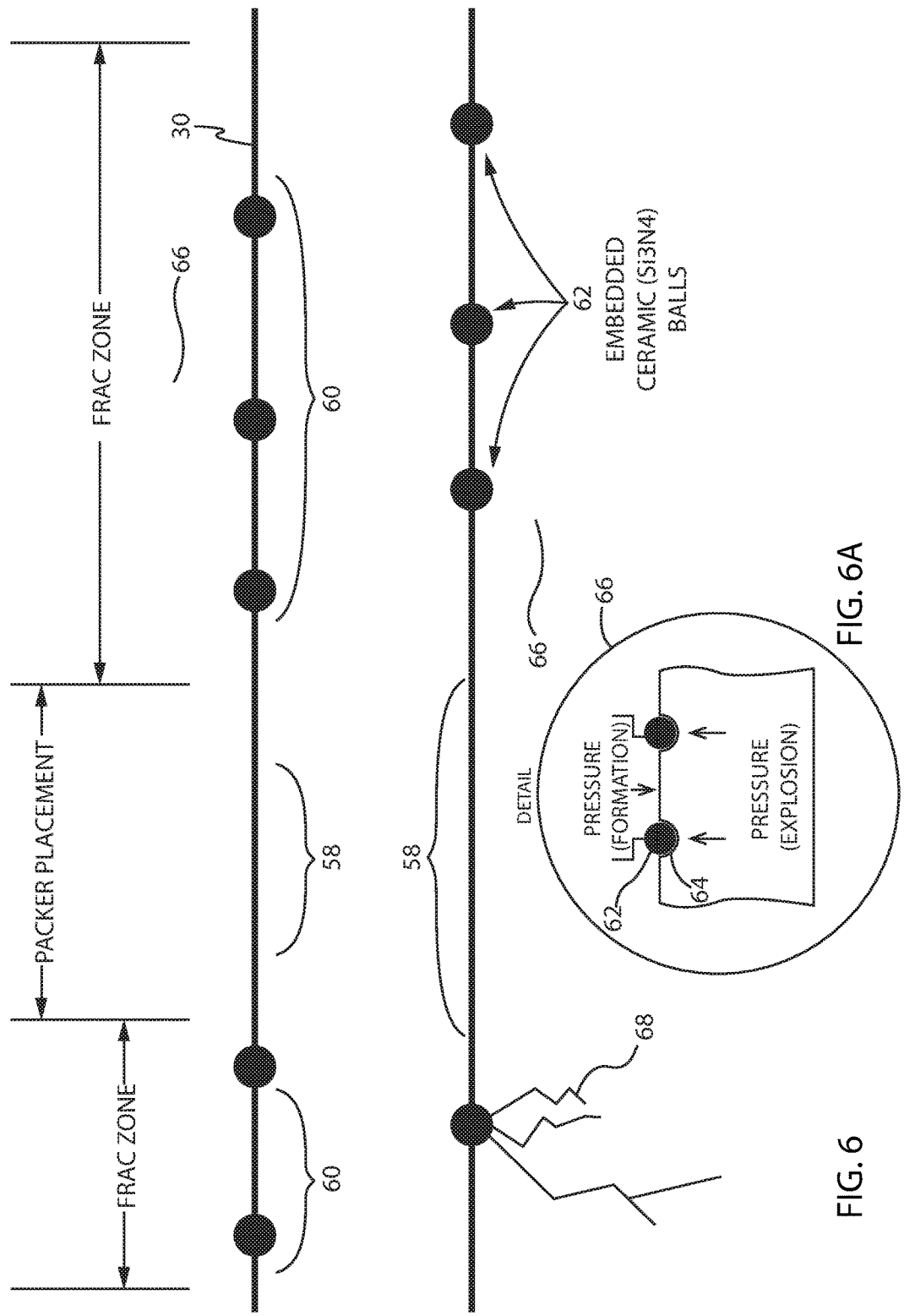

FRACTURING UTILIZING AN AIR/FUEL MIXTURE

CROSS-REFERENCE TO RELATED APPLICATION

This application claims priority to U.S. Provisional Patent Application No. 62/180,473, filed on Jun. 16, 2015, the entirety of which is expressly incorporated by reference herein.

BACKGROUND OF THE INVENTION

1. Field of the Invention

The preferred embodiments relate generally to the field of hydrocarbon recovery from the earth, and more specifically, to fracturing underground formations for the recovery of hydrocarbons using a method of fracturing the formations with the use of an auto-igniting air and fuel mixture.

2. Discussion of the Related Art

Fracturing as a method to stimulate shallow, hard rock oil wells dates back to the 1860s. Dynamite or nitroglycerin detonations were used to increase oil and natural gas production from petroleum bearing formations. On Apr. 25, 1865, Civil War veteran Col. Edward A. L. Roberts received a patent for a Torpedo with U.S. Pat. No. 47,458. Stimulation of wells with acid, instead of explosive fluids, was introduced in the 1930s.

The relationship between well performance and treatment pressures was studied as far back as 1947 where 1,000 US gallons of gelled gasoline (essentially napalm) and sand from the Arkansas River was injected into the gas-producing limestone formation at 2,400 feet (730 m). The experiment was not very successful as deliverability of the well did not change appreciably. The Halliburton company is known to have performed the first two commercial hydraulic fracturing treatments in Stephens County, Okla., and Archer County, Tex. Since then, hydraulic fracturing has been used to stimulate approximately one million oil and gas wells in various geologic regimes.

American geologists became increasingly aware that there were huge volumes of gas-saturated sandstones with permeability too low (generally less than 0.1 millidarcy) to recover the gas economically. Starting in 1973, massive hydraulic fracturing was used in thousands of gas wells in the San Juan Basin, Denver Basin, the Piceance Basin, the Green River Basin, and in other hard rock formations of the western US. Other tight sandstone wells in the US made economically viable by massive hydraulic fracturing were in the Clinton-Medina Sandstone, and Cotton Valley Sandstone.

Horizontal oil or gas wells were unusual until the late 1980s. Then, operators in Texas began completing thousands of oil wells by drilling horizontally in the Austin Chalk, and giving massive slickwater hydraulic fracturing treatments to the wellbores. Horizontal wells proved much more effective than vertical wells in producing oil from tight chalk; sedimentary beds are usually nearly horizontal, so horizontal wells have much larger contact areas with the target formation.

Due to shale's low permeability, technological research, development and demonstration were necessary before hydraulic fracturing was accepted for commercial application to shale gas deposits. In 1976, the United States government started the Eastern Gas Shales Project, a set of dozens of public-private hydraulic fracturing demonstration projects. During the same period, the Gas Research Institute, a gas industry research consortium, received approval for research and funding from the Federal Energy Regulatory Commission.

In 1997, taking the slickwater fracturing technique used in East Texas by Union Pacific Resources (now part of Anadarko Petroleum Corporation), Mitchell Energy (now part of Devon Energy), applied the technique in the Barnett Shale of north Texas. This made gas extraction widely economical in the Barnett Shale, and was later applied to other shales. The first horizontal well in the Barnett Shale was drilled in 1991, but was not widely done in the Barnett until it was demonstrated that gas could be economically extracted from vertical wells in the Barnett.

According to the United States Environmental Protection Agency (EPA), hydraulic fracturing is a process to stimulate a natural gas, oil, or geothermal energy well to maximize extraction. The EPA defines the broader process as including the acquisition of source water, well construction, well stimulation, and waste disposal.

A hydraulic fracture is formed by pumping fracturing fluid into a wellbore at a rate sufficient to increase pressure at the target depth (determined by the location of the well casing perforations), to exceed that of the fracture gradient (pressure gradient) of the rock formation. The fracture gradient is defined as pressure increase per unit of depth relative to density, and is usually measured in pounds per square inch, per foot, or bars per meter. The rock formation cracks, and the fracture fluid permeates the rock extending the crack further, and further, and so on. Fractures are localized as pressure drops off with the rate of frictional loss, which is relevant to the distance from the well. Operators typically try to maintain "fracture width", or slow its decline following treatment, by introducing a proppant into the injected fluid (a material such as grains of sand, ceramic, or other particulate, thus preventing the fractures from closing when injection is stopped and pressure removed). Consideration of proppant strength and prevention of proppant failure becomes more important at greater depths where pressure and stresses on fractures are higher. The propped fracture is permeable enough to allow the flow of gas, oil, salt water and hydraulic fracturing fluids to the well.

During the process, fracturing fluid leakoff (loss of fracturing fluid from the fracture channel into the surrounding permeable rock) occurs. If not controlled, it can exceed 70% of the injected volume. This may result in formation matrix damage, adverse formation fluid interaction, and altered fracture geometry, thereby decreasing efficiency.

The location of one or more fractures along the length of the well hole is preferably strictly controlled by various methods that create or seal holes in the side of the wellbore. Hydraulic fracturing is performed in cased wellbores, and the zones to be fractured are accessed by perforating the casing at those locations.

Hydraulic-fracturing equipment used in oil and natural gas fields usually consists of a slurry blender, one or more high-pressure, high-volume fracturing pumps (typically powerful triplex or quintuplex pumps) and a monitoring unit. Associated equipment includes fracturing tanks, one or more units for storage and handling of proppant, high-pressure treating iron, a chemical additive unit (used to accurately monitor chemical addition), low-pressure flexible hoses, and many gauges and meters for flow rate, fluid density, and treating pressure. Chemical additives are typically 0.5% percent of the total fluid volume. Fracturing equipment operates over a range of pressures and injection rates, and can reach up to 100 megapascals (15,000 psi) and 265 liters per second (9.4 cu ft/s) (100 barrels per minute).

The fracturing fluid varies depending on fracturing type desired, and the conditions of specific wells being fractured, and water characteristics. The fluid can be gel, foam, or slickwater-based. Fluid choices include tradeoffs: more viscous fluids, such as gels, are better at keeping proppant in suspension; while less-viscous and lower-friction fluids, such as slickwater, allow fluid to be pumped at higher rates, to create fractures farther out from the wellbore. Important material properties of the fluid include viscosity, pH, various rheological factors, and others.

The water brought in is mixed with sand and chemicals to create fracking fluid. Approximately 40,000 gallons of chemicals are used per fracturing. A typical fracture treatment uses between 3 and 12 additive chemicals. Although there may be unconventional fracturing fluids, typical chemical additives can include one or more of the following:

Acids—hydrochloric acid or acetic acid is used in the pre-fracturing stage for cleaning the perforations and initiating fissure in the near-wellbore rock.

Sodium chloride (salt)—delays breakdown of gel polymer chains.

Polyacrylamide and other friction reducers decrease turbulence in fluid flow and pipe friction, thus allowing the pumps to pump at a higher rate without having greater pressure on the surface.

Ethylene glycol—prevents formation of scale deposits in the pipe.

Borate salts—used for maintaining fluid viscosity during the temperature increase.

Sodium and potassium carbonates—used for maintaining effectiveness of crosslinkers.

Glutaraldehyde—used as disinfectant of the water (bacteria elimination).

Guar gum and other water-soluble gelling agents—increases viscosity of the fracturing fluid to deliver proppant into the formation more efficiently.

Citric acid—used for corrosion prevention.

Isopropanol—used to winterize the chemicals to ensure it doesn't freeze.

The most common chemical used for hydraulic fracturing in the United States in 2005-2009 was methanol, while some other most widely used chemicals were isopropyl alcohol, 2-butoxyethanol, and ethylene glycol.

Typical fluid types are:

Conventional linear gels. These gels are cellulose derivative (carboxymethyl cellulose, hydroxyethyl cellulose, carboxymethyl hydroxyethyl cellulose, hydroxypropyl cellulose, hydroxyethyl methyl cellulose), guar or its derivatives (hydroxypropyl guar, carboxymethyl hydroxypropyl guar), mixed with other chemicals.

Borate-crosslinked fluids. These are guar-based fluids cross-linked with boron ions (from aqueous borax/ boric acid solution). These gels have higher viscosity at pH 9 onwards and are used to carry proppant. After the fracturing job, the pH is reduced to 3-4 so that the cross-links are broken, and the gel is less viscous and can be pumped out.

Organometallic-crosslinked fluids zirconium, chromium, antimony, titanium salts are known to crosslink the guar-based gels. The crosslinking mechanism is not reversible, so once the proppant is pumped down along with cross-linked gel, the fracturing part is done. The gels are broken down with appropriate breakers.

Aluminum phosphate-ester oil gels. Aluminum phosphate and ester oils are slurried to form cross-linked gel. These are one of the first known gelling systems.

For slickwater it is common to include a temporary reduction in the proppant concentration to ensure the well is not overwhelmed with proppant causing a screen-off. As the fracturing process proceeds, viscosity reducing agents such as oxidizers and enzyme breakers are sometimes then added to the fracturing fluid to deactivate the gelling agents and encourage flowback. The oxidizer reacts with the gel to break it down, reducing the fluid's viscosity, and ensuring that no proppant is pulled from the formation. An enzyme acts as a catalyst for breaking down the gel. Sometimes pH modifiers are used to break down the crosslink at the end of a hydraulic fracturing job since many require a pH buffer system to stay viscous. At the end of the job, the well is commonly flushed with water (sometimes blended with a friction reducing chemical) under pressure. Injected fluid is recovered to some degree and managed by several methods such as underground injection control, treatment and discharge, recycling, or temporary storage in pits or containers. New technology is continually being developed to better handle waste water and improve re-usability.

There are a number of potential public health impacts of exposures to chemical and radioactive pollutants as a result of hydraulic fracturing. Some evidence suggests that contamination of groundwater, if it occurs, is most likely to be caused by leakage through the vertical borehole. Contamination of groundwater from the underground hydraulic fracturing process itself (i.e., the fracturing of the shale) is unlikely. However, surface spills of hydraulic fracturing fluids or wastewater may affect groundwater, and emissions to air also have the potential to impact on health.

Further environmental impacts of hydraulic fracturing include air emissions for the generators and pumps necessary to produce the incredible fracturing pressures, high water consumption, water contamination from all the chemical additives, land use, noise pollution, and health effects on humans. Moreover, overall cost associated with such known systems with expensive equipment (capital outlay and maintenance) and high cost of operation is dramatic, creating a need for lower cost systems. In addition, about 8.9 acres of land is needed per each drill pad for surface installations. Well pad and supporting structure construction significantly fragments landscapes which likely has negative effects on wildlife.

What is therefore needed is a method of fracturing difficult-to-extract formations which does not use harmful chemical additives. What is further needed is a method of fracturing subterranean formations while occupying a much smaller footprint at the well's surface. An additional need is a method of fracturing that uses considerably less energy and therefore is less costly and produces less harmful byproducts and emissions.

SUMMARY AND OBJECTS OF THE INVENTION

Fracturing a subterranean formation begins by drilling a well hole into the earth. A combustible mixture of an oxidizer and a fuel, preferably an air and fuel mixture, may be flowed into the well hole. An aqueous mixture with a mass may be pumped into the well hole which compresses the combustible mixture with the mass of the aqueous mixture pressing down on the combustible mixture. The combustible mixture may be caused to auto-ignite under the compressive force of the mass of the aqueous mixture thereby fracturing at least a portion of the subterranean well location. A plurality of hydrocarbons emitted from the fractured subterranean well location may then be collected.

The fuel for the air and fuel mixture may include any known fuel, but preferably is one of a group including diesel fuel, a carbohydrate including wheat flour, corn flour, rice flour, barley flour, organic starches, powdered plastics, powdered coal, powdered fecal matter. A plurality of piezo crystals may be added to the air and fuel mixture as they provide sparking under pressure and friction, which may assist detonation of the air and fuel mixture when desired.

The fuel preferably is diesel fuel and the diesel fuel is aerosolized with the oxidizer. The oxidizer is at least one of aluminum nitrate, ammonium nitrate, and ambient air at a surface of the well hole.

A packer plug may be inserted into the well hole before and after the air and fuel mixture. The packer plug may be pressed further down the well hole thus creating the application of pressure to auto-detonate the air and fuel mixture.

Following detonation of the air and fuel mixture, the well hole may be sterilized with steam generated from the auto-detonation of the aqueous mixture eliminating the need of a bacteriacide.

Frozen water may be used as a pressure barrier between the aqueous mixture and the air and fuel mixture allowing the application of pressure to the air and fuel mixture without submersing the air and fuel. A proppant may also be added to the aqueous mixture to ensure newly created fissures remain open. The aqueous mixture may include a mixture of liquid water and a gel made from at least one of guar and cross linked polymers.

According to a first preferred embodiment, a method of fracturing includes drilling a well hole into a subterranean well location and flowing a combustible mixture of an oxidizer and a fuel into the well hole. Next, the method includes flowing an aqueous mixture with a mass into the well hole, compressing the combustible mixture with the mass of the aqueous mixture, and causing the combustible mixture to auto-ignite under a compressive force of the mass. As a result, at least a portion of the subterranean well location is fractured with the explosion from the auto-ignition such that a plurality of hydrocarbons emitted from the fractured subterranean well location can be collected.

In another preferred embodiment, a process of collecting hydrocarbons from a subterranean environment includes drilling a well hole to a predetermined depth sufficient to reach a hydrocarbon deposit, and flowing an air and fuel mixture into the well hole. This method includes auto-detonating the air and fuel mixture with an application of pressure into the well hole, so that the subterranean environment is fractured with the energy of the auto-detonation. A plurality of hydrocarbons in the hydrocarbon deposit from the well hole is then recovered.

In a further aspect of this preferred embodiment, the method further includes inserting a packer plug into the well hole and driving it down the well hole, thus creating the application of pressure to auto-detonate the air and fuel mixture. An aqueous mixture is pumped into the well hole to create the application of pressure with a weight of the aqueous mixture.

In another aspect of this preferred embodiment, the well hole is sterilized with a steam generated from the auto-detonation of the aqueous mixture and without a bacteriacide.

In yet another preferred embodiment, a method of fracturing subterranean location includes forming a hole extending from a surface of the earth into a hydrocarbon deposit, and inserting an aerosol into the well hole to a depth sufficient to reach the hydrocarbon deposit. Then, a liquid with a mass is flowed into the hole, compressing the aerosol within the hydrocarbon deposit with a pressure from a weight of the liquid. Furthermore the aerosol is pressurized with the weight of the liquid to a pressure of sufficient magnitude causing auto-ignition of the aerosol, and fracturing the subterranean location with an explosion from the auto-ignition.

In another aspect of this preferred embodiment, a packer plug is inserted into the hole wherein the packer plug includes a pressure reducing orifice after flowing the liquid, and provides a pressure into the well hole through the pressure reducing orifice, thus further fracturing the subterranean location.

In yet another aspect of this embodiment, the hole is disinfected with a steam generated from the explosion.

According to another aspect of this embodiment, the aerosol is formed with a combustible fuel and air that is ambient surrounding the surface of the earth proximate the hole.

In another aspect of this preferred embodiment, a proppant is mixed with the liquid at least one of prior and during the flowing of the liquid into the hole. Further, the liquid is flowed into the subterranean location following the explosion.

According to yet another aspect of this embodiment, the liquid flows into the hole following the auto-ignition and provides additional fracturing by creating a steam and a thermal shock to the subterranean location.

In a further aspect of this preferred embodiment, the liquid includes a mixture of liquid water and a gel made from at least one of guar and cross linked polymers.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary, and, therefore, non-limiting, embodiments illustrated in the drawings accompanying and forming a part of this specification, wherein like reference numerals designate the same elements in the several views, and in which:

FIG. 6 illustrates a partial cross section side view of another embodiment of the invention;

FIG. 6A is a detail view of a portion of the fracking apparatus shown in FIG. 6.

Figure 1:
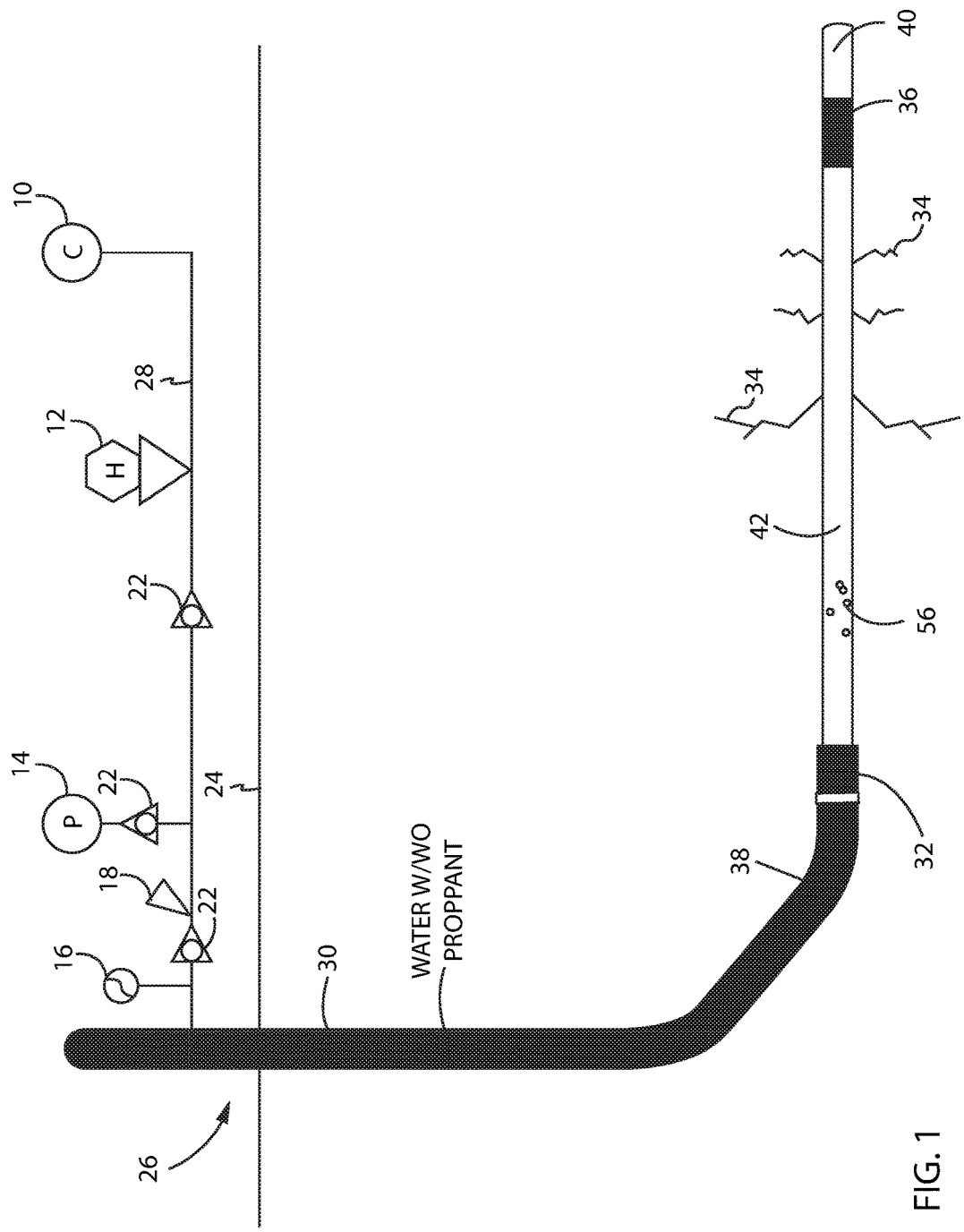
FIG. 1 illustrates a schematic view of a first embodiment of the invention with an open hole and single packer.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, one embodiment of the invention is shown. Above the ground surface 24 piping 28 connects an air compressor with a powder mixing hopper 12. The powder mixing hopper 12 may add either a powder carbohydrate into the piping 28 or it may be configured to inject any other fuel source such as diesel fuel. The powder carbohydrate may include any carbohydrate such as corn starch, flour, animal/human waste, or any other known starch. The powder and/or fuel is injected into the piping 28 and is effectively aerosolized by the air compressor 10. This forms an air fuel mixture within the piping 28.

Ambient air from above the ground surface 24 is ingested into the air compressor 10. Pressurized air is created and clean dry air is flowed to and through an air educator located at the bottom of the hopper 12. The air educator in the hopper 12 creates a vacuum that pulls in the explosive powder or fuel mixture contained in the hopper 12. The air and fuel mixture then flows to and thru a check valve 22. This check valve 22 prevents the mixture from flowing backwards in the piping 28.

From the check valve 12 the air and fuel mixture flows through the piping 28 and to the bottom of the well 30. A packer, such as an inflatable packer 36, may be inserted into the well 30 and act as a stop which prevents the air and fuel mixture 56 from reaching a portion of the well 30 where fracturing is not desirable. The inflatable packer 36 then creates a sealed well area 40 that does not get fractured.

The air and fuel mixture, now inside the well 30, is pumped through the well 30 until it is stopped by the inflatable packer 36. This packer 36 stops the flow of the air and fuel mixture 56 and causes it to flow into any naturally occurring fissures 34 in the formation.

The air fuel mixture 56 flows through a "pig" launcher 18 just above the ground surface 24. During the pumping of the air and fuel mixture 56, its velocity is kept low in order to allow heat built up by friction in the air and fuel mixture 56 to be dissipated into the formation. This transfer of heat in to the formation prevents premature ignition of the air and fuel mixture 56.

An added check valve 20 and pressure gage 16 is used to monitor the flow and into the well head 26. The pig launcher 18 is an injection port where a "packer pig" may be introduced into the well head 26. A packer pig or pig refers to a plug that may be inserted down into the well 30 and act as a barrier that restricts transmission of fluids, but allows the fluid to build up and generate pressure. Preferably, the pig is in the form of a dissolvable and temporary product. One embodiment may include ice but any substance that dissolves may be used. The ice pig 32 can plug up the well 30 and allow a liquid 38 to be pumped in by the liquid pump 14. After the well 30 has received a predetermined amount of explosive air and fuel mixture 56, the ice pig is placed in the launcher 18 and the liquid (water) pump 14 is engaged. The liquid pump 14 may be used to deliver any aqueous mixture. Preferably, water is used and all other chemicals are avoided. This prevents introduction of harmful surfactants, biocides, or any other chemicals. Water pumped by the liquid pump then pushes the ice pig 32 ahead of it, blocking the explosive air and fuel mixture 56 from getting behind it, and creating a water column.

This column of water becomes a piston causing the explosive air and fuel mixture 56 to compress within the compression chamber 42. The rate of this compression is controlled to again allow the heat of compression to be dissipated in to the formation and avoid premature ignition of the mixture.

Once a predetermined amount of water 38 (or water and proppant) has been pumped in to the well 30, the rate of injection is abruptly and dramatically increased. This rapid increase in water injection compresses the explosive air and fuel mixture 56 within the compression chamber 42 at a rate at which the formation cannot effectively accept the transfer of heat. At this point, heat builds up within the explosive air and fuel mixture 56 and auto-ignition temperature is reach causing it to detonate.

All of the kinetic energy of the explosion goes in to the formation. Any naturally occurring methane within the naturally occurring fissures will add to the explosion. The explosion will create a large amount of heat and it will be absorbed by the formation. The ice pig 32 at this point may be dissolved and the water 38 that once provided pressure on the explosive mixture will now flow, under pressure, in to the fissures 34 where they will be thermally shocked causing fracturing. Heat will be transferred into the water creating steam whose pressure will create additional fracturing 34. The water will eventually condense, becoming distilled water with its microbes killed by the heat, and flow out of the well with well gas and or oil and produced water.

Figure 2:
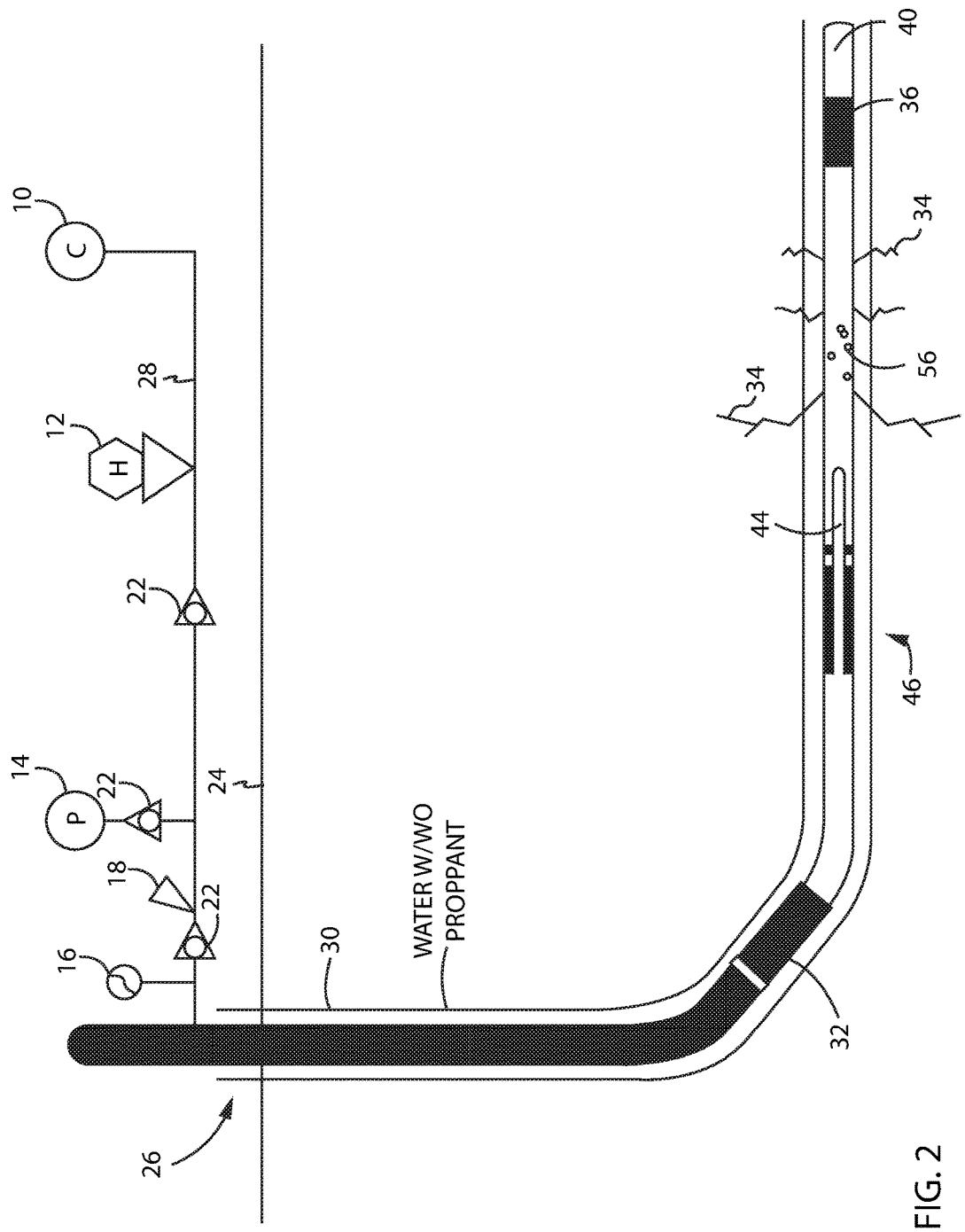
FIG. 2 illustrates a schematic view of an alternative embodiment of the invention with two packers in a production cased well hole.
Figure 3:
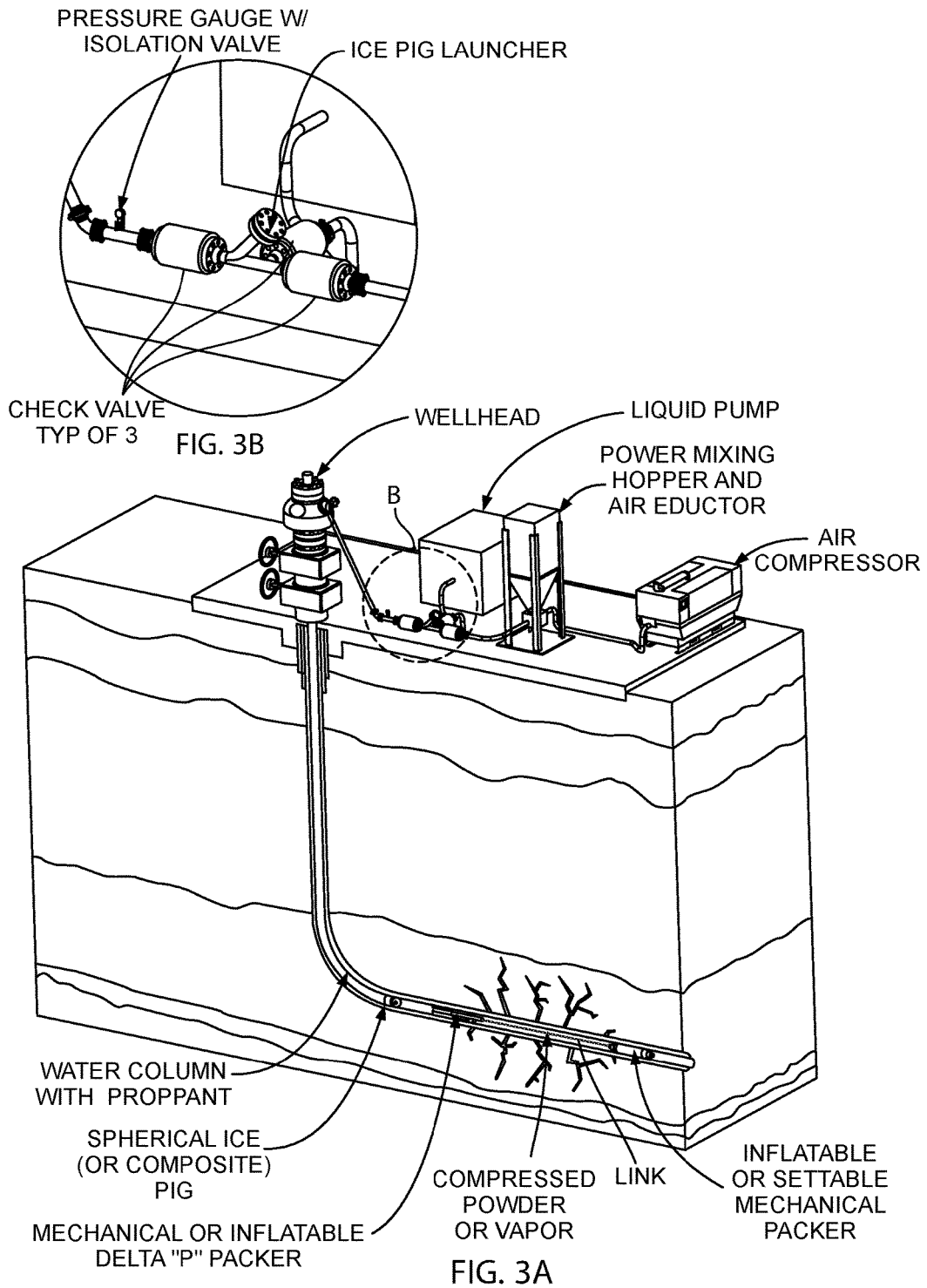
FIG. 3A illustrates a schematic perspective view of an alternative embodiment of the invention with two packers in a production cased well hole as shown in FIG. 2, with further clarity.
FIG. 3B is an exploded view of a portion of the fracking apparatus shown in FIG. 3A.
Figure 4:
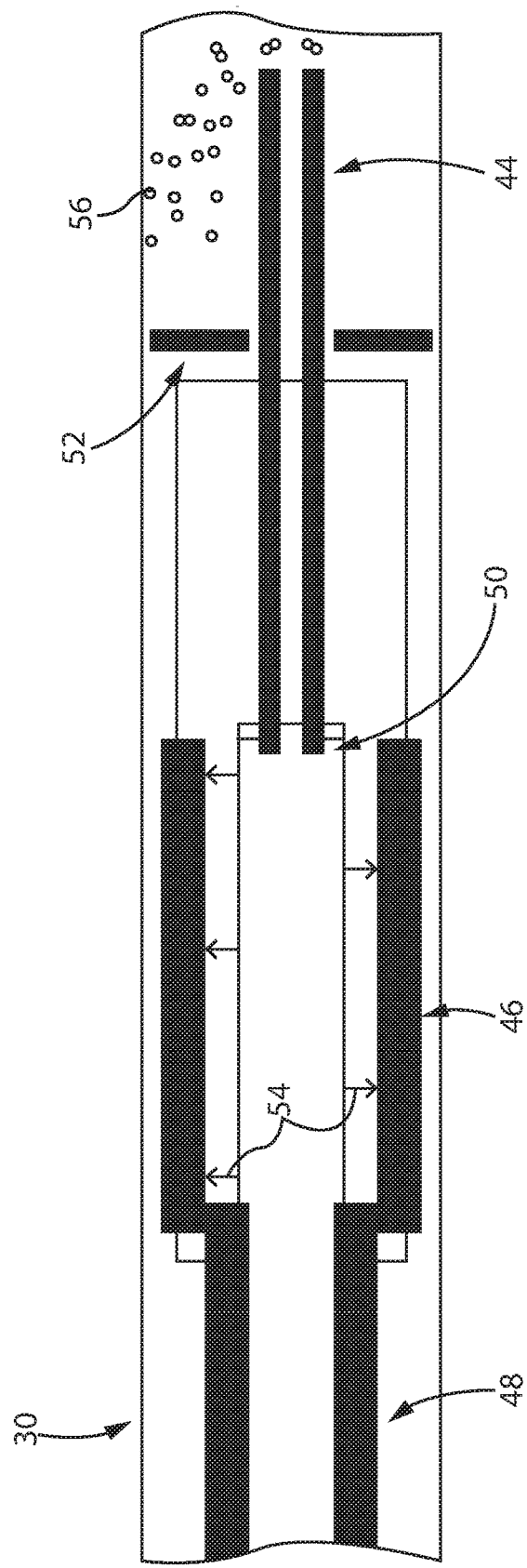
FIG. 4 illustrates a partial cross-section schematic side view of the packer as used with respect to FIG. 2.
Figure 5A:
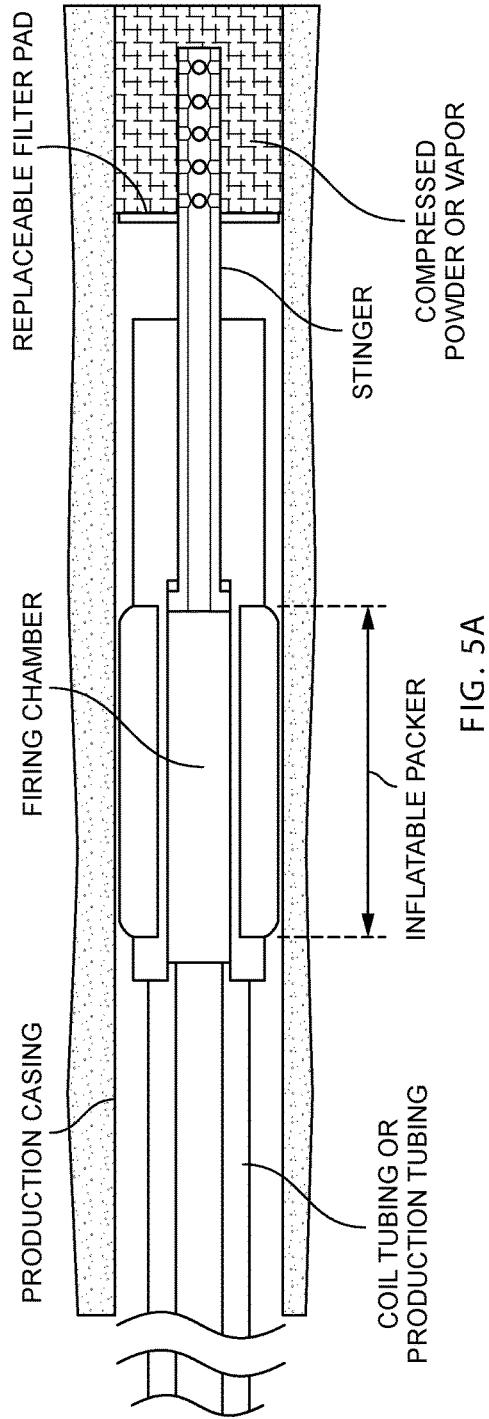
FIG. 5A illustrates a partial cross-section side view of the packer as used with respect to FIG. 3A.
Figure 5B:
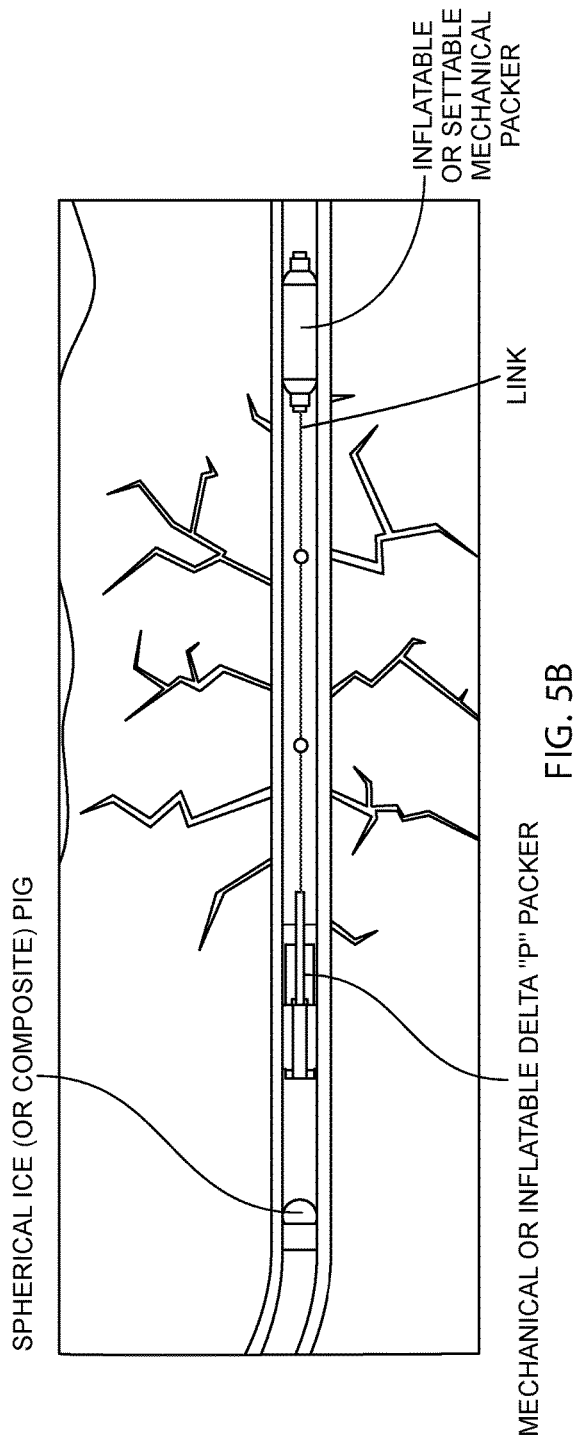
FIG. 5B is a partial cross-sectioned view of the fracking apparatus of FIG. 5A installed in a formation.
Figure 7:
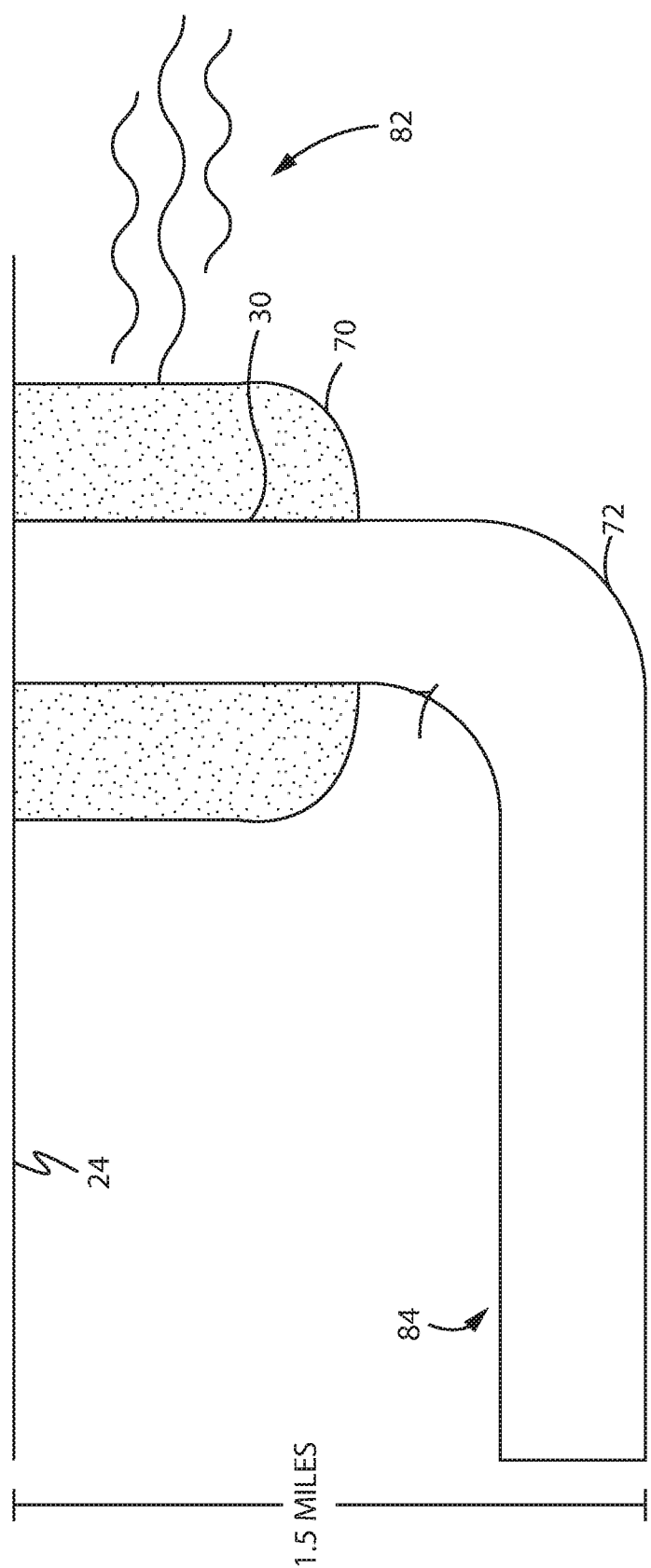
FIGS. 7-13 illustrate chronological schematic cross-sectional side views of a method of executing the fracking operation of a preferred embodiment.

Referring now to FIGS. 2, 3A, 3B, 4, 5A, and 5B, an alternative embodiment is described. FIGS. 2, 3A, and 3B show an overall schematic of the invention while FIGS. 4 and 5A and 5B show an inventive packer for executing the process, illustrated, e.g., schematically together with the system in FIGS. 2, 3A, and 3B.

Similar with respect to FIG. 1, and with more specific reference to FIGS. 2 and 3A, ambient air above the ground surface 34 is ingested into air compressor 10. Pressurized air is generated by the air compressor 10 and clean dry air is flowed to and thru an air educator located at the bottom of hopper 12. The air educator of the hopper 12 creates a vacuum that pulls in an explosive air and fuel mixture 56 contained in the hopper 12. The air and fuel explosive mixture 56 then flows to and thru a check valve 22. This check valve 22 prevents the air and fuel mixture 56 from flowing backwards in the piping 28. From the check valve 22 the air and fuel mixture 56 flows to the output of liquid pump 14, and through a pig launcher 18 (see FIG. 3B), check valve 20, pressure gage 16 and in to the oil well head 26.

Now inside the well 30, the air and fuel mixture 56 is pumped down the well 30 and into the firing chamber 50 of the inflatable packer 46. FIGS. 4 and 5A show more detailed and close-up views of the inflatable packer 46. The explosive air and fuel mixture 56 flows though the smaller diameter stinger 44 and in to the area between the inflatable packer 46 and the inflatable packer 36. Once inside this compression chamber 42 the air and fuel mixture 56 will attempt to flow back through the filter pad 52 and into the lower pressure area behind the inflatable packer 46 and outside of the compression chamber 42. The filter pad 52 will capture the powder or other fuel in the air and "load" up. This loading creates a rise in the air pressure in the production tubing casing 30 causing the inflatable packer 46 to "set", closing off the area between the inflatable packer 46 and the casing 30. This pressure increase will be detected as a rise in pressure at the pressure gage 16 at the ground surface 24.

As the air and fuel mixture 56 is pumped into the compression chamber 42, its velocity is kept low in order to allow heat built up by friction in the mixture to be dissipated into the casing 30. Keeping the air and fuel mixture 56 pumped at a low velocity allows ample time to transfer frictional heat into the casing 30 and prevents premature ignition of the air and fuel mixture 56. This also eliminates the need for adding lubricants and other fracking fluids to the air and fuel mixture 56.

Once a rise in pressure is detected at the ground surface 24 by the pressure gage 16, the compression chamber 42 between the inflatable packer 46 and the other inflatable packer 36 is full of sufficient air and fuel mixture 56. The inflatable packer 46 is then ready. A ball of ice, or an ice pig 32, may then be inserted into the pig launcher 18 and the liquid pump 14 is engaged.

Water pumped by the liquid pump 14 pushes the ice pig 32 ahead of it, blocking the explosive air and fuel mixture 56 from getting behind it, and creating a water column. This column of water becomes a piston causing the explosive air and fuel mixture 56 within the compression chamber 42 to compress. The rate of this compression is controlled to again allow the heat of compression to be dissipated in to the casing 30 and avoid premature ignition of the air and fuel mixture 56.

Once a predetermined amount of water (or water and proppant) has been pumped into the well, the rate of injection is abruptly and dramatically increased. This rapid increase in water injection rapidly compresses the explosive air and fuel mixture 56 in the firing chamber 50 at a rate at which the inflatable packer 46 cannot effectively accept the transfer of heat. At this point, heat builds up within the explosive air and fuel mixture 56 and auto-ignition temperature is reached causing detonation. Heat and explosive gases are now directed through the stinger 44 and in to the explosive laden compression chamber between the inflatable packers 46 and 36. This causes ignition of the explosive air and fuel mixture 56 between the packers 46 and 36. Much of the pressure from the explosion is prevented from moving back thru the packer by the reduced and smaller opening in the stinger 46, as shown best in FIG. 4 and FIGS. 5A and 5B.

To maintain fracturing in the region of interest, the separation between the packers (such as the mechanical or inflatable delta "P" packer and the inflatable or settable mechanical packer, shown in FIGS. 3A and 5B) is preferably maintained. Typically, the packers are set so as to maintain their positions in the well during the fracturing event. This arrangement relies on setting the packers so the friction force between the outer surface of the packer and the inner wall of the well is sufficient to prevent either of the packers from dislodging from its location and possibly shooting back through the well. However, increasing this clamping force when setting the packers can be difficult (a system which allows the user to set the packers with less clamping force is desired), and the resultant friction force is often insufficient to maintain packer position during fracturing. Therefore, as an option to aid in maintaining this separation, a link (as shown in FIGS. 3A and 5B) may be added between the packers to couple the two to one another. By coupling the two, maintaining packer position is ensured so that the surface area of the compression chamber is constant and fracturing occurs in the region of interest.

To accommodate the turn of well 30 from the vertical to the horizontal, the link may include several bars or sections coupled, for example, using a clevis fastener and an eye (shown schematically in FIGS. 3A and 5B) provided on the ends of two or more successive sections of the link. In this way, the desired distance between the packers can be maintained through the fracturing process.

All of the kinetic energy of the explosion is absorbed in to the formation and spreads through any naturally occurring fissures 34. Any naturally occurring methane within the naturally occurring fissures 34 will add to the explosion. The explosion of the air and fuel mixture 56 may by itself cause new fissures 34 to form. The water that once provided pressure on the explosive air and fuel mixture 56 will now flow under pressure through the dissolved ice pig 32 and in to the fissures 34 where they will be thermally shocked causing additional fracturing. Heat will be transferred into the water creating steam whose pressure will create even more fracturing. The water will eventually condense, becoming distilled water with its microbes killed by the heat, and flow out of the well with wells gas and/or oil and produced water.

Referring now to FIGS. 6A and 6B, another embodiment of the invention is shown. Ceramic balls 62 may be imbedded into the well casing 30. The embedded ceramic balls 62 provide a convenient way to create openings in the casing for fracturing the formation that surrounds it. This casing 30 is traditionally installed in the well and cemented in a normal manner. Inflatable packers may then be positioned in the areas between the groupings of embedded ceramic balls shown as packer placement 58.

When an air and fuel mixture 56 is detonated (as outlined with respect to FIGS. 1 and 2), the ceramic balls 62 are forced out of their embedded pockets 64 and into the formation 66 creating a fracture 68 and leaving the remains of the ceramic ball as a proppant to hold the newly fractured 68 formation 66 open. This method eliminates the need for conventional perforations in the casing 30 and can be used in "overbalanced" (pressurized formation) as well as "balanced" and "underbalanced" (negative pressure) formations. Balanced formations define formations with a consistent density and hardness of the surrounding geology. Underbalanced refers to geology with inconsistent density and hardness, which makes it difficult to achieve uniform fracturing. Some formations may fracture before others absorbing all of the explosive energy. The ceramic balls 62 may be affixed to the casing in any known manner, but preferably are epoxied into dimple pockets 64 that may be machined in to the casing 30. The ceramic balls 62 ensure even and thorough fracturing.

FIGS. 7-13 summarize and illustrate a preferred embodiment of the process and the method of fracturing. Beginning with FIG. 7, a well hole 72 may be drilled into the earth below the ground surface 24. In order to keep the well hole 72 open, a steel liner, or well casing, 30 may be pressed into the well hole. Cement 70 or concrete is typically pumped around the casing 30 for added strengthening. The casing 30 and cement 70 also ensure that the well hole 72 is sealed and any surrounding aquifer 82 is protected. Any aquifers 72 are commonly located closer to the ground surface 24 than the targeted fracking area 84. For example, the typical fracking area is about 1.5 miles below the ground surface 24. Most aquifers 82 are 100 feet or less below the ground surface 24.

Figure 8:
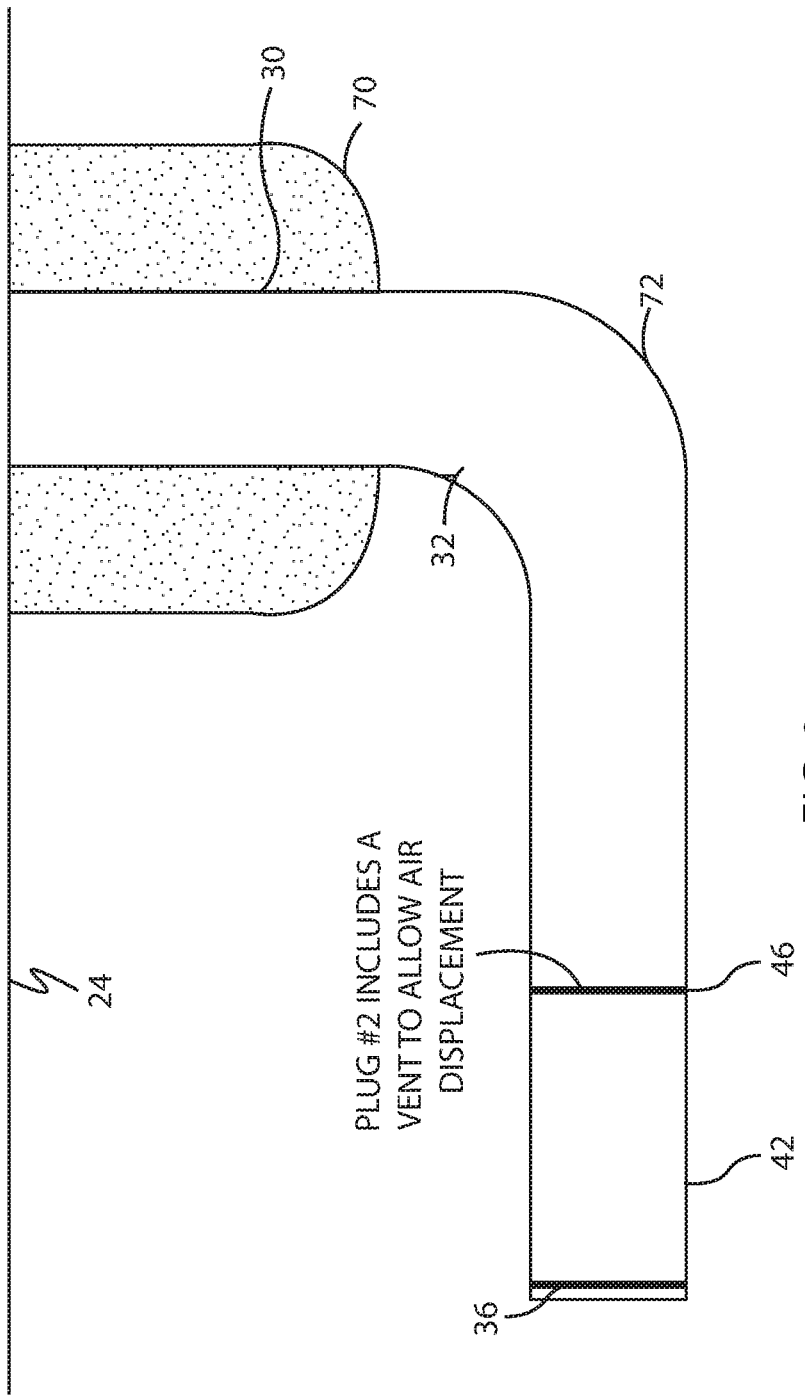
Figure 9:
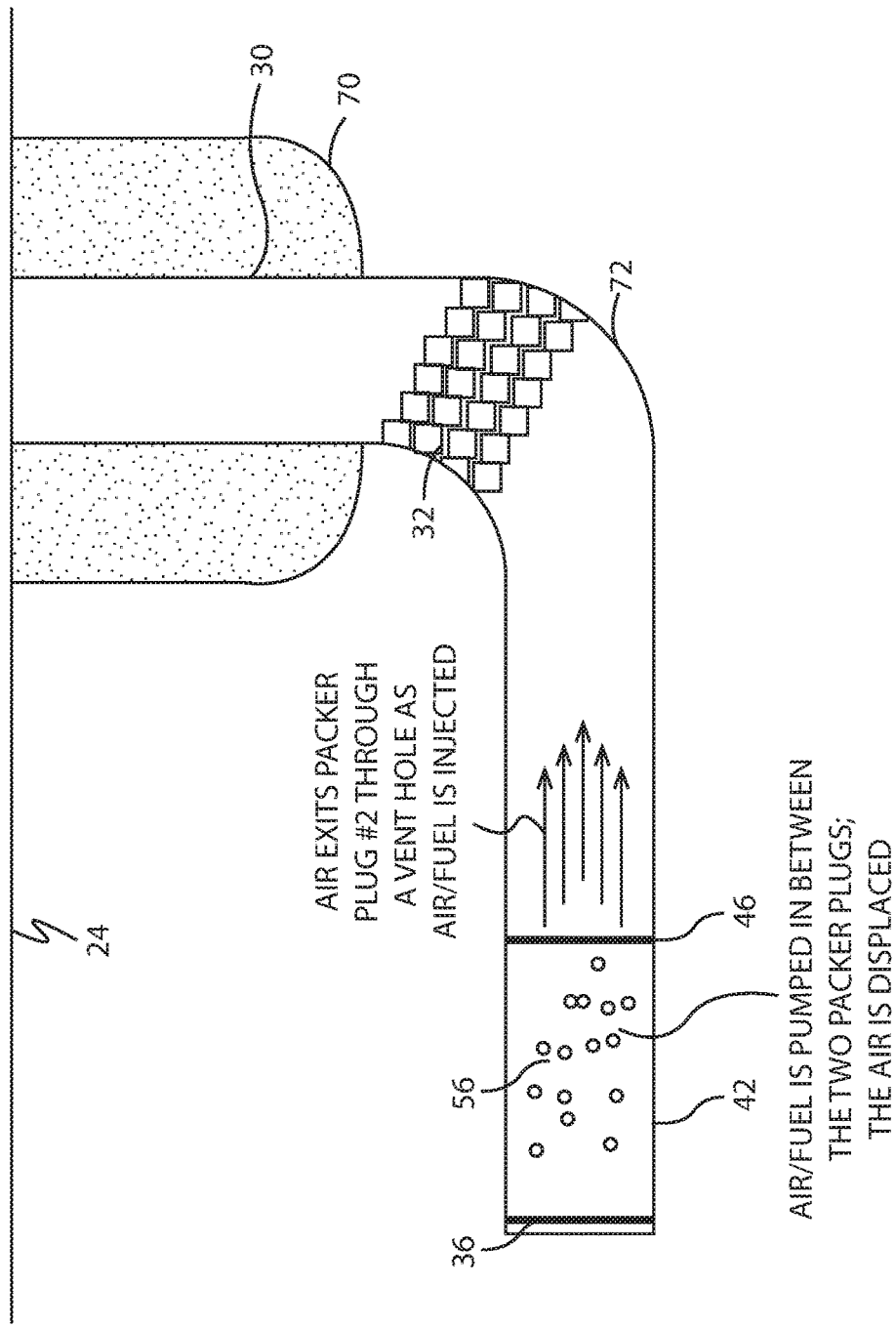

As shown in FIG. 8, following creation of the well hole 72, a first packer plug 36 may be inserted into the well hole 72. A second packer plug 46 may then be placed into the well hole 72 creating a pressure chamber 42, as described with respect to FIGS. 1 and 2. FIG. 9 discloses the air and fuel mixture 56 which may be pumped into the compression chamber 42. Air may be displaced out of the compression chamber and exit packer plug 46 out of a vent hole. The vent hole may include a check valve to prevent re-entry of displaced material. As the air and fuel mixture 56 is pumped into the compression chamber 42, the pressure within the compression chamber 42 is monitored to ensure ignition is not prematurely attained.

Figure 10:
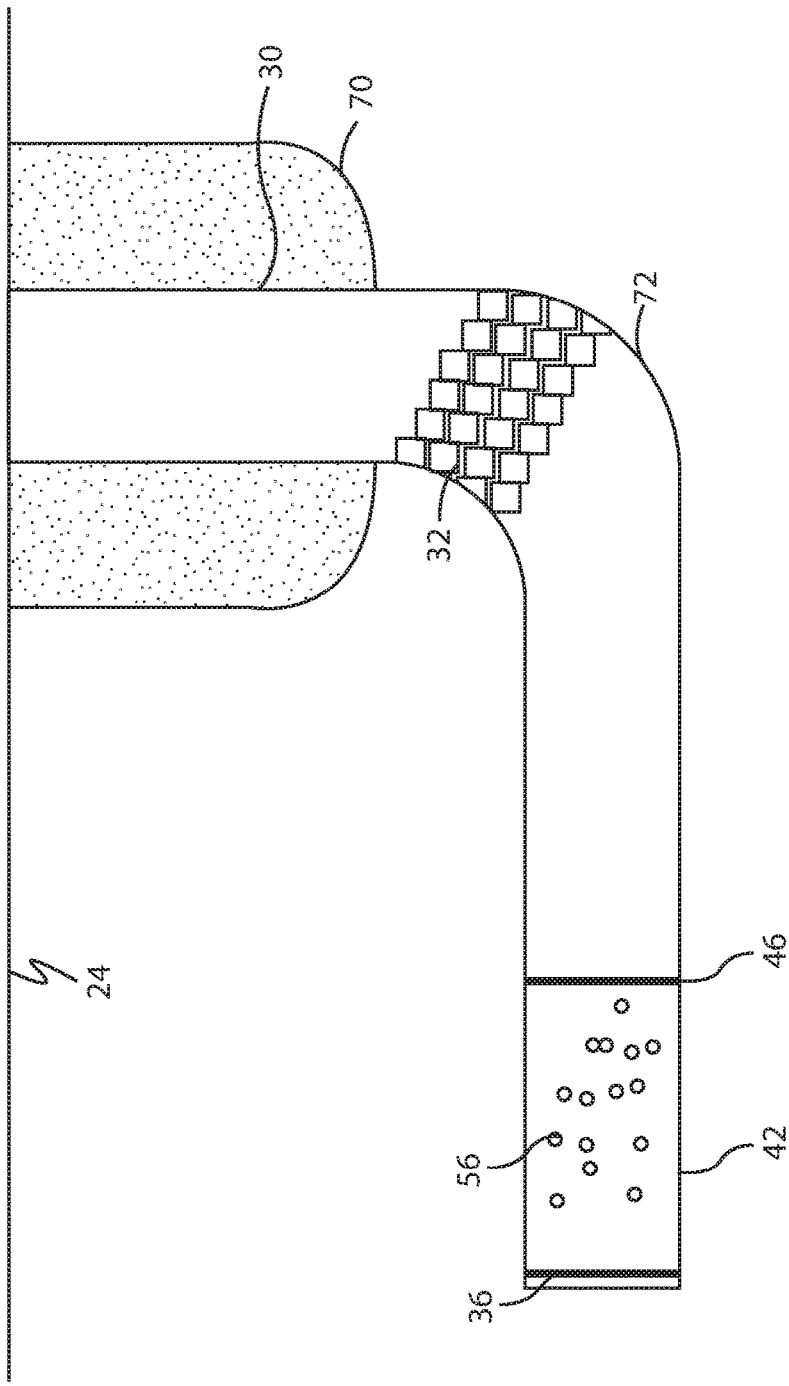
Figure 11:
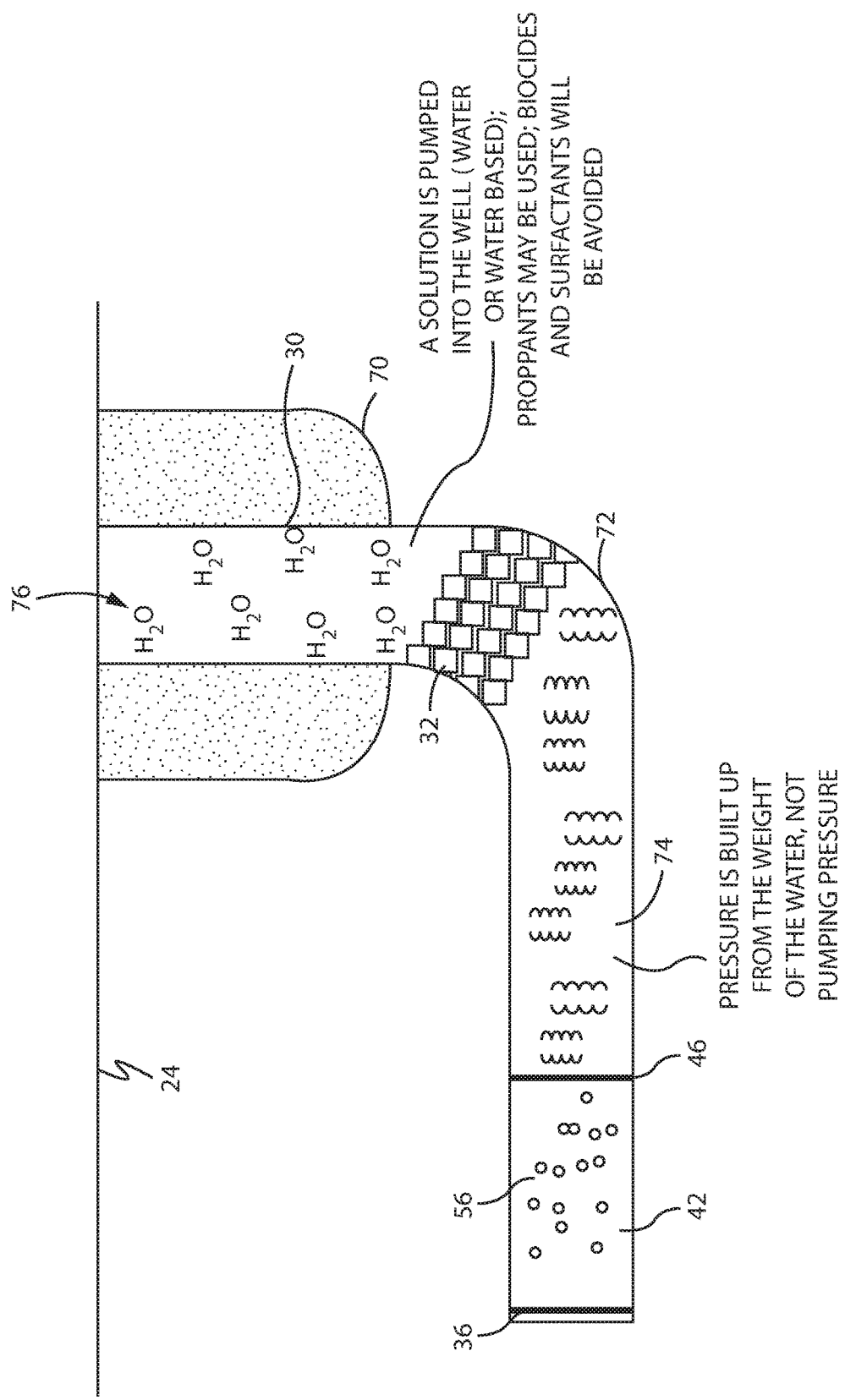

Shown in FIG. 10, the ice pig 32 may then be placed into the well hole 72 to create a pressure barrier and prevent any fluid from rushing to the compression chamber 42. The fluid is also kept separate to ensure proper detonation of the air and fuel mixture 42. Referring to FIG. 11 water 76 may be injected into the well hole 72. The ice pig 32 forms a pressure barrier and keeps the water 76 from filling the entire well hole 72. The ice pig 32 acts as a movable piston and compresses the space in the well hole building up pressure 74. The pressure 74 presses against the compression chamber 42.

Figure 12:
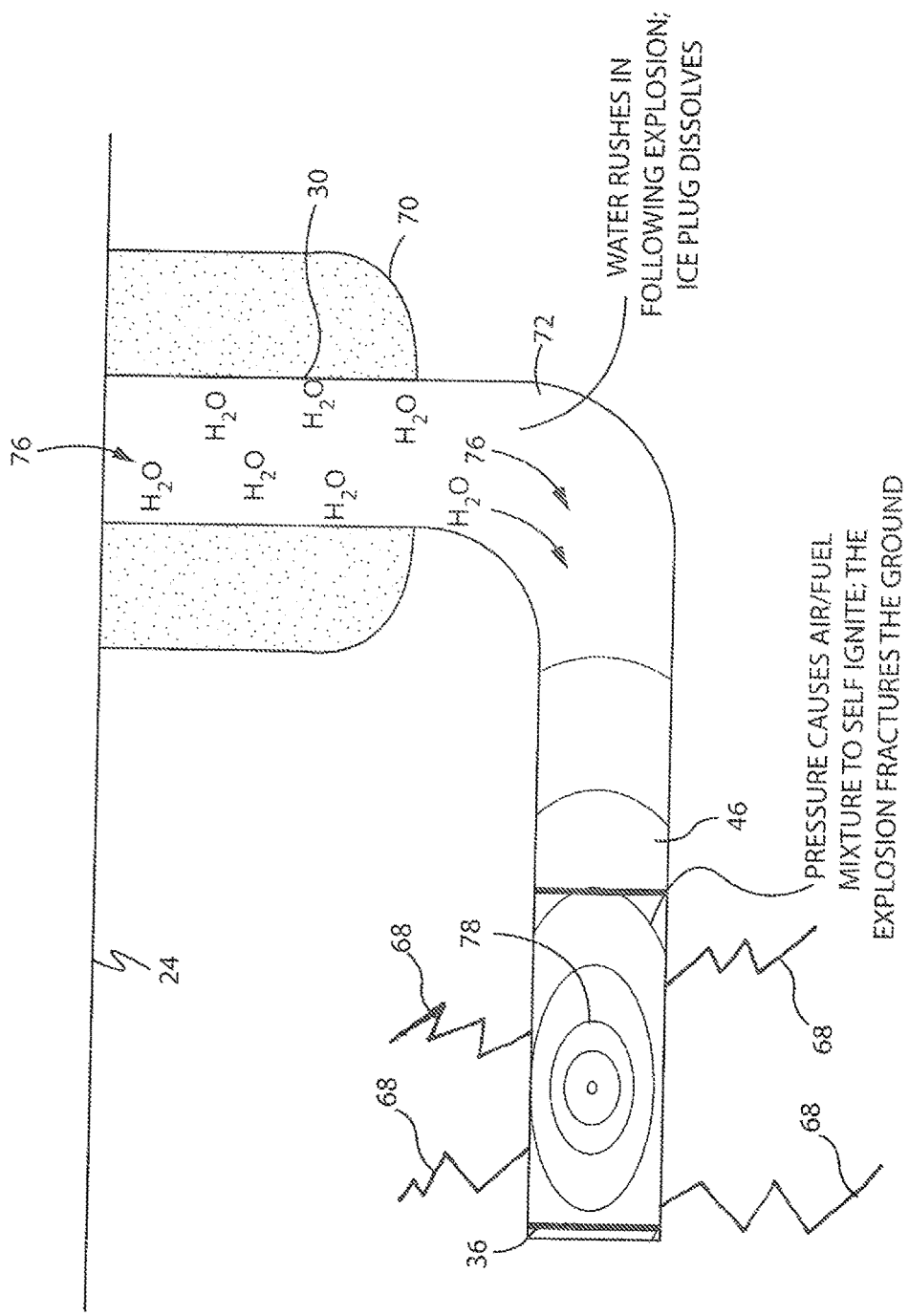
Figure 13:
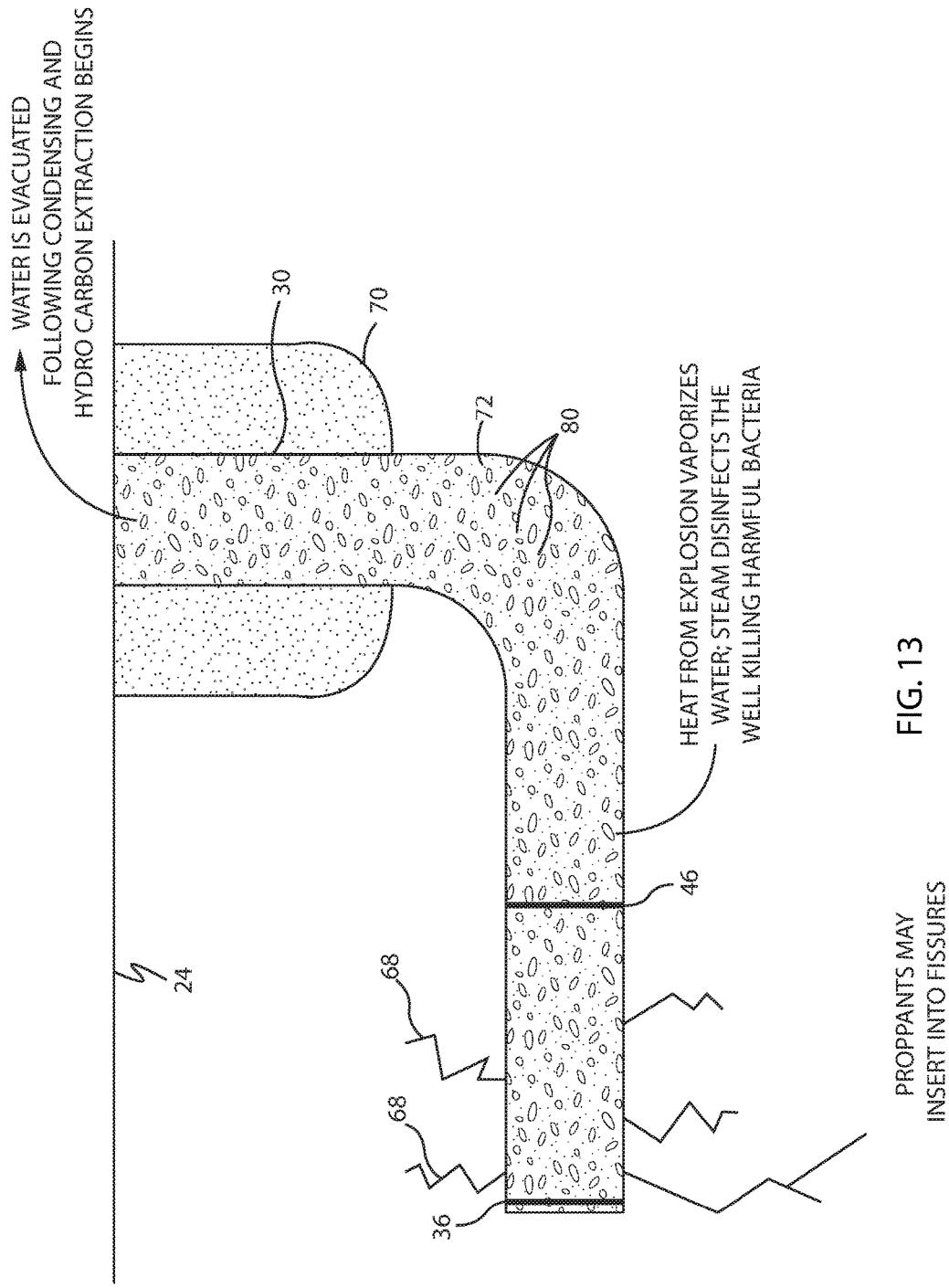

Referring to FIG. 12, the pressure causes the air and fuel mixture within the compression chamber 42 to auto-ignite and explode causing fractures 68. The water 76 may then rush in to fill the well hole 72 after the ice pig 32 is dissolved. The intense heat generated by the explosion vaporizes the water 76 forming steam 80 as seen in FIG. 13. The steam 80 expands causing additional fractures 68. The heat from the steam 80 and the explosion also sterilize the well hole 72 and eliminate the need for chemicals commonly used to prevent bacteria growth.

The pure water may then be pumped out of the well hole 72 and any hydrocarbons may be collected from the well. As harmful fracking fluids are not necessary, the water may be re-used and safely stored. The surrounding aquifers are also further protected as there are no chemicals to leech into the ground. Any oil mixed within the water may also be easily skimmed and collected.

An added benefit is that the auto-ignition pressure point of the air and fuel mixture 56 is significantly lower than the amount of pressure required to fracture using known methods, such as hydraulic fracturing. Known fracking methods require 20,000 psi or greater pressure to crack the formations. Producing this kind of pressure requires a great deal of energy. This energy is produced above the ground surface by engines combusting hydrocarbons. Many engines are commonly used to operate a multitude pumps. The inventive fracking method only requires a relatively small amount of pressure to fracture the subterranean formations. The weight of the water column injected into the well produces the majority of the pressure needed to auto-ignite the air and fuel mixture. Only about 200 psi of water pressure is required to be generated with pumps at the ground surface 24. This reduces the footprint of the fracking site at the ground surface and also drastically reduces the amount of fuel needed for the pumps. Fewer pumps are required, less vehicles to move the pumps, less personnel to operate the equipment, and an overall lower economic expenditure.

Additionally, while inflatable packers are disclosed throughout, other packers are considered acceptable for use. For example, mechanical packers may be used for execution of the invention. One example of a mechanical packer is manufactured by World Oil Tools in Calgary, Alberta, Canada. These packers, or any other packer, may be used in the preferred embodiments.

There are virtually innumerable uses for the present apparatus and methods, all of which need not be detailed here. Additionally, all the disclosed embodiments can be practiced without undue experimentation. Further, although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept (as disclosed herein).

In addition, the individual components of the present invention discussed herein need not be fabricated from the disclosed materials, but could be fabricated from virtually any suitable materials. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A process of collecting hydrocarbons from a subterranean environment comprising:
    drilling a well hole to a predetermined depth sufficient to reach a hydrocarbon deposit;
    flowing an air and fuel mixture into the well hole;
    auto-igniting the air and fuel mixture with an application of pressure into the well hole;
    fracturing the subterranean environment with an explosion from the auto-ignition; and
    recovering a plurality of hydrocarbons in the hydrocarbon deposit from the well hole.

2. The method of claim 1 further comprising inserting a packer plug into the well hole and driving it down the well hole thus facilitating the application of pressure to auto-ignite the air and fuel mixture by driving the packer plug into the fuel and air mixture.

3. The method of claim 2 wherein the packer plug comprises at least one of a frozen water formation and a dissolving solid inserted between the air and fuel mixture and the application of pressure.

4. The method of claim 1 further comprising pumping an aqueous mixture into the well hole to create the application of pressure with a weight of the aqueous mixture.

5. The method of claim 4 further comprising sterilizing the well hole with a steam generated from the explosion and the aqueous mixture and without a bactericide.

6. A method of fracturing comprising:
    drilling a well hole into a subterranean well location;
    flowing a combustible mixture of an oxidizer and a fuel into the well hole;

flowing an aqueous mixture with a mass into the well hole, wherein the aqueous mixture is maintained separate from the combustible mixture;

compressing the combustible mixture with the mass of the aqueous mixture;

causing the combustible mixture to auto-ignite under a compressive force of the mass;

fracturing at least a portion of the subterranean well location with an explosion from the auto-ignition; and collecting a plurality of hydrocarbons emitted from the fractured subterranean well location.

7. The method of claim 6 wherein the fuel is one of a group consisting of diesel fuel, a carbohydrate including wheat flour, corn flour, rice flour, barley flour, organic starches, powdered plastics, powdered coal, and powdered fecal matter, and a plurality of piezo crystals, and wherein the aqueous mixture is maintained separate from the combustible mixture with a packer plug.

8. The method of claim 7 wherein the fuel is diesel fuel and the diesel fuel is aerosolized and the oxidizer is at least one of aluminum nitrate, ammonium nitrate, and ambient air at a surface of the well hole.

9. A method of fracturing subterranean location comprising:

forming a hole extending from a surface of the earth into a hydrocarbon deposit;

inserting an aerosol into the hole to a depth sufficient to reach the hydrocarbon deposit;

inserting a packer plug into the hole after the aerosol;

flowing a liquid with a mass into the hole, wherein the packer plug separates the liquid from the aerosol;

compressing the aerosol within the hydrocarbon deposit with a pressure from a weight of the liquid;

pressurizing the aerosol with the weight of the liquid to a pressure of sufficient magnitude causing auto-ignition of the aerosol; and fracturing the subterranean location with an explosion from the auto-ignition.

10. The method of claim 9 further comprising inserting a packer plug into the hole prior to flowing the liquid.

11. The method of claim 9, wherein
the packer plug includes a pressure reducing orifice, and further comprising,
providing a pressure into the hole through the pressure reducing orifice thus further fracturing the subterranean location.

12. The method of claim 9 further comprising disinfecting the hole with a steam generated from the explosion.

13. The method of claim 9 wherein the liquid does not fill a portion of the hole extending into the subterranean location.

14. The method of claim 9 further comprising forming the aerosol with a combustible fuel and an air that is ambient surrounding the surface of the earth proximate the hole.

15. The method of claim 9 further comprising flowing the liquid into the hole following the auto-ignition and providing additional fracturing by creating a steam and a thermal shock to the subterranean location.

16. The method of claim 9 wherein the liquid includes a mixture of liquid water and a gel made from at least one of guar and cross linked polymers.

17. The method of claim 9 further comprising mixing a proppant with the liquid at least one of prior and during the flowing of the liquid into the hole.

18. The method of claim 17 further comprising flowing the liquid into the subterranean location following the explosion.

19. The method of claim 18 further comprising inserting the proppant into a plurality of fractures formed in the shale formation following the explosion.

20. The method of claim 18 wherein the subterranean location includes at least one of shale formations, tight formations, porous formations, vertical wells, and horizontal wells.

* * * * *